US012654774B2

(12) United States Patent
Horiguchi

(10) Patent No.: US 12,654,774 B2
(45) Date of Patent: Jun. 16, 2026

(54) FRAME STRUCTURE

(71) Applicant: ISUZU MOTORS LIMITED, Tokyo (JP)

(72) Inventor: Kenichi Horiguchi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 371 days.

(21) Appl. No.: 18/550,785

(22) PCT Filed: Mar. 3, 2022

(86) PCT No.: PCT/JP2022/009027
§ 371 (c)(1),
(2) Date: Sep. 15, 2023

(87) PCT Pub. No.: WO2022/196367
PCT Pub. Date: Sep. 22, 2022

(65) Prior Publication Data
US 2024/0190504 A1     Jun. 13, 2024

(30) Foreign Application Priority Data
Mar. 16, 2021     (JP) ................................. 2021-042215

(51) Int. Cl.
*B62D 21/02*          (2006.01)
(52) U.S. Cl.
CPC .................................. *B62D 21/02* (2013.01)
(58) Field of Classification Search
CPC ....... B62D 21/02; B62D 27/023; B62D 21/07
See application file for complete search history.

(56) References Cited

U.S. PATENT DOCUMENTS 2,935,335 A      5/1960  Muller et al.
4,557,519 A  *  12/1985  Matsuura ........... B62D 25/2027
296/187.11

(Continued)

FOREIGN PATENT DOCUMENTS

CN        202147725 U  *  2/2012  ............. B62D 21/08
CN        104691624 A      6/2015
(Continued)

OTHER PUBLICATIONS

International Search Report from International Application No. PCT/JP2022/009027 mailed Apr. 12, 2022.

*Primary Examiner* — Drew J Brown
(74) *Attorney, Agent, or Firm* — Shih IP Law Group, PLLC

(57)          ABSTRACT

A frame structure includes: a front intermediate member and a rear intermediate member provided in a width direction of a vehicle; a first front side member and a second front side member that are inserted into front through-holes of the front intermediate member and extend forward from the front intermediate member; a first rear side member and a second rear side member that are inserted into rear through-holes of the rear intermediate member and extend rearward from the rear intermediate member; and a first intermediate side member and a second intermediate side member that are fixed between the front intermediate member and the rear intermediate member in a state of being inserted in the front through-holes of the front intermediate member and the rear through-holes of the rear intermediate member.

14 Claims, 3 Drawing Sheets

(56) References Cited

U.S. PATENT DOCUMENTS

| | | | | |
|---|---|---|---|---|
| 5,458,393 | A * | 10/1995 | Benedyk | B62D 23/005 |
| | | | | 280/798 |
| 6,099,194 | A * | 8/2000 | Durand | B62D 21/02 |
| | | | | 296/29 |
| 6,276,477 | B1 * | 8/2001 | Ida | B62D 21/10 |
| | | | | 296/193.04 |
| 6,302,478 | B1 * | 10/2001 | Jaekel | B62D 23/005 |
| | | | | 296/205 |
| 6,824,204 | B2 * | 11/2004 | Gabbianelli | B62D 25/2036 |
| | | | | 296/193.06 |
| 7,325,866 | B2 | 2/2008 | Horton et al. | |
| 7,547,063 | B2 * | 6/2009 | Stojkovic | B62D 25/04 |
| | | | | 296/203.03 |
| 8,272,682 | B2 * | 9/2012 | Cimatti | B62D 25/025 |
| | | | | 296/204 |
| 8,857,853 | B2 * | 10/2014 | Lin | B62D 21/12 |
| | | | | 280/124.109 |
| 9,139,228 | B2 * | 9/2015 | Chen | B62K 5/01 |
| 9,139,235 | B2 * | 9/2015 | Craig | B62D 27/023 |
| 2001/0050497 | A1 * | 12/2001 | Jaekel | B62D 23/005 |
| | | | | 296/205 |
| 2004/0239091 | A1 | 12/2004 | Horton et al. | |
| 2010/0187800 | A1 * | 7/2010 | Chen | B62D 23/005 |
| | | | | 180/311 |
| 2013/0026796 | A1 * | 1/2013 | Wagner | B23K 33/006 |
| | | | | 296/204 |
| 2017/0253271 | A1 | 9/2017 | Bertezzolo | |
| 2020/0047811 | A1 * | 2/2020 | Shimizu | B62D 21/02 |
| 2020/0130495 | A1 * | 4/2020 | Shimizu | B62D 21/155 |
| 2020/0406975 | A1 | 12/2020 | Nagaya | |
| 2025/0050948 | A1 * | 2/2025 | Standifer | B62D 27/06 |

FOREIGN PATENT DOCUMENTS

| | | | | |
|---|---|---|---|---|
| CN | 117508354 A | * | 2/2024 | B62D 21/14 |
| EP | 2733050 A1 | * | 5/2014 | B62D 21/07 |
| JP | H10-258765 A | | 9/1998 | |
| JP | 2012-183924 A | | 9/2012 | |
| JP | 2014-069686 A | | 4/2014 | |
| JP | 2017-530901 A | | 10/2017 | |
| JP | 2021-006436 A | | 1/2021 | |
| WO | WO-02070322 A1 | * | 9/2002 | B62D 23/005 |
| WO | WO-2023062676 A1 | * | 4/2023 | B62D 21/02 |

* cited by examiner

FRONT ← → REAR

FRAME STRUCTURE

CROSS-REFERENCE TO RELATED APPLICATIONS

The present application is a U.S. National Stage entry of PCT Application number PCT/JP2022/009027, filed on Mar. 3, 2022, which claims priority under 35 U.S.C § 119(a) to Japanese Patent Application No. 2021-042215, filed on Mar. 16, 2021, contents of which are incorporated herein by reference in their entirety.

TECHNICAL FIELD

The present disclosure relates to a frame structure in a vehicle.

BACKGROUND OF THE INVENTION

Conventionally, a vehicle is provided with a plurality of side frames extending in a longitudinal direction. Patent Document 1 discloses a frame structure in which the distance between two side frames in a partial region in the longitudinal direction of a vehicle is different from a distance in other regions.

PRIOR ART

Patent Document

Japanese Unexamined Patent Application Publication No. 2014-069686

BRIEF DESCRIPTION OF THE INVENTION

Problem to be Solved by the Invention

In order to provide a battery or other equipment on the side of a side frame of a vehicle, it is required to increase the distance between side frames in a partial region. Since the conventional side frame is formed such that the direction of a partial region is different from directions of other regions by bending a linear side frame, the strength of the side frame decreases when a bending amount of the side frame is increased.

The present disclosure has been made in view of these points, and its object is to increase a distance between a plurality of side frames in a partial region of a vehicle while ensuring sufficient strength.

Means for Solving the Problem

A frame structure of the present disclosure is a frame structure in a vehicle, the frame structure includes: a front intermediate member that has four or more front through-holes and is provided such that a longitudinal direction of the front intermediate member coincides with a width direction of the vehicle; a rear intermediate member that has four or more rear through-holes and is provided behind the front intermediate member such that a longitudinal direction of the rear intermediate member coincides with the width direction of the vehicle; a first front side member that is fixed to a first front through-hole of the front intermediate member in a state of being inserted in the first front through-hole and extends forward from the front intermediate member; a second front side member that is fixed to a second front through-hole of the front intermediate member in a state of being inserted in the second front through-hole and extends forward from the front intermediate member; a first rear side member that is fixed to a first rear through-hole of the rear intermediate member in a state of being inserted in the first rear through-hole and extends rearward from the rear intermediate member; a second rear side member that is fixed to a second rear through-hole of the rear intermediate member in a state of being inserted in the second rear through-hole and extends rearward from the rear intermediate member; a first intermediate side member that is fixed between the front intermediate member and the rear intermediate member in a state of being inserted in a third front through-hole of the front intermediate member and a third rear through-hole of the rear intermediate member; and a second intermediate side member that is fixed between the front intermediate member and the rear intermediate member in a state of being inserted in a fourth front through-hole of the front intermediate member and a fourth rear through-hole of the rear intermediate member.

A position of the first front through-hole in the longitudinal direction of the front intermediate member may be the same as a position of the first rear through-hole in the longitudinal direction of the rear intermediate member, and a position of the second front through-hole in the longitudinal direction of the front intermediate member may be the same as a position of the second rear through-hole in the longitudinal direction of the rear intermediate member. A longitudinal-direction extension line of the first front side member and a longitudinal-direction extension line of the first rear side member may coincide with each other, and a longitudinal-direction extension line of the second front side member and a longitudinal-direction extension line of the second rear side member may coincide with each other.

A position of the third front through-hole in the longitudinal direction of the front intermediate member may be the same as a position of the third rear through-hole in the longitudinal direction of the rear intermediate member; a position of the fourth front through-hole in the longitudinal direction of the front intermediate member may be the same as a position of the fourth rear through-hole in the longitudinal direction of the rear intermediate member; and the first intermediate side member and the second intermediate side member may be parallel to each other.

The positions of the first front through-hole and the second front through-hole in the longitudinal direction of the front intermediate member may be closer to a center of the vehicle than the positions of the third front through-hole and the fourth front through-hole in the longitudinal direction of the front intermediate member.

The position of the first front through-hole and the position of the first rear through-hole in a height direction of the vehicle may be different from each other, the position of the second front through-hole and the position of the second rear through-hole in the height direction of the vehicle may be different from each other, the positions of the third front through-hole and the third rear through-hole in the height direction of the vehicle may be the same, and the positions of the fourth front through-hole and the fourth rear through-hole in the height direction of the vehicle may be the same.

The first intermediate side member may include a first reinforcing member provided at least one of above or below a linear first base member, the second intermediate side member may include a second reinforcing member provided at least one of above or below a linear second base member, and a width of the first intermediate side member and a width of the second intermediate side member in the height direction of the vehicle in a region between the front intermediate member and the rear intermediate member may be larger than a width of the first intermediate side member and a width of the second intermediate side member in the height direction of the vehicle in a region in front of the front intermediate member and behind the rear intermediate member.

Effect of the Invention

According to the present disclosure, it is possible to increase a distance between a plurality of side frames in a partial region of a vehicle while ensuring sufficient strength.

DESCRIPTION OF EMBODIMENTS

[Configuration of the Frame Structure 1]

Figure 1:
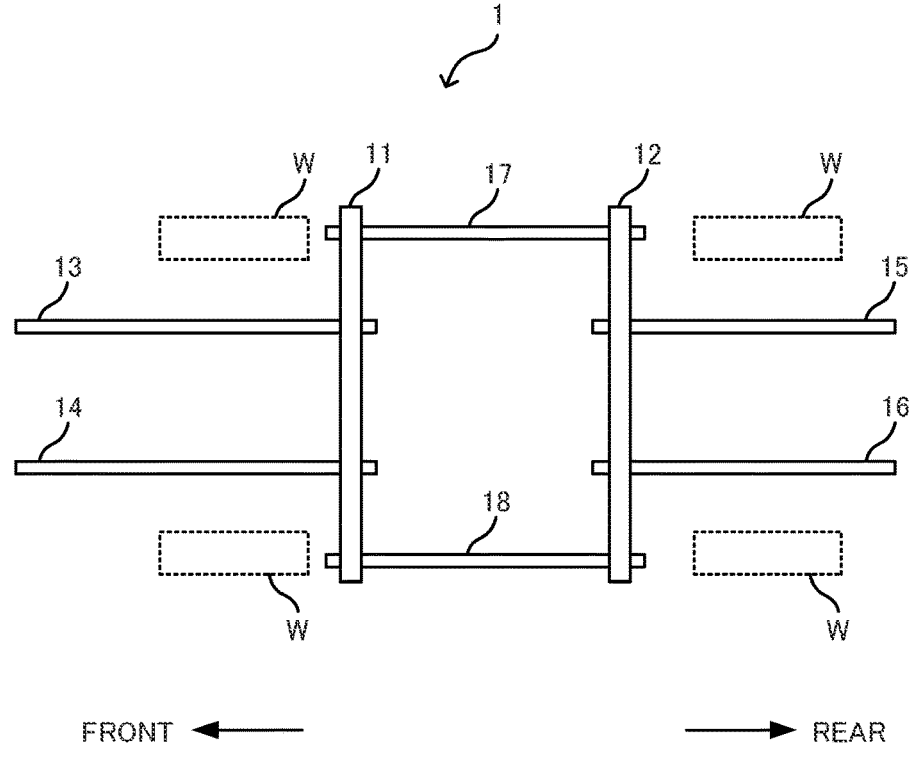
FIG. 1 shows an outline of a frame structure mounted in a vehicle.
Figure 2:
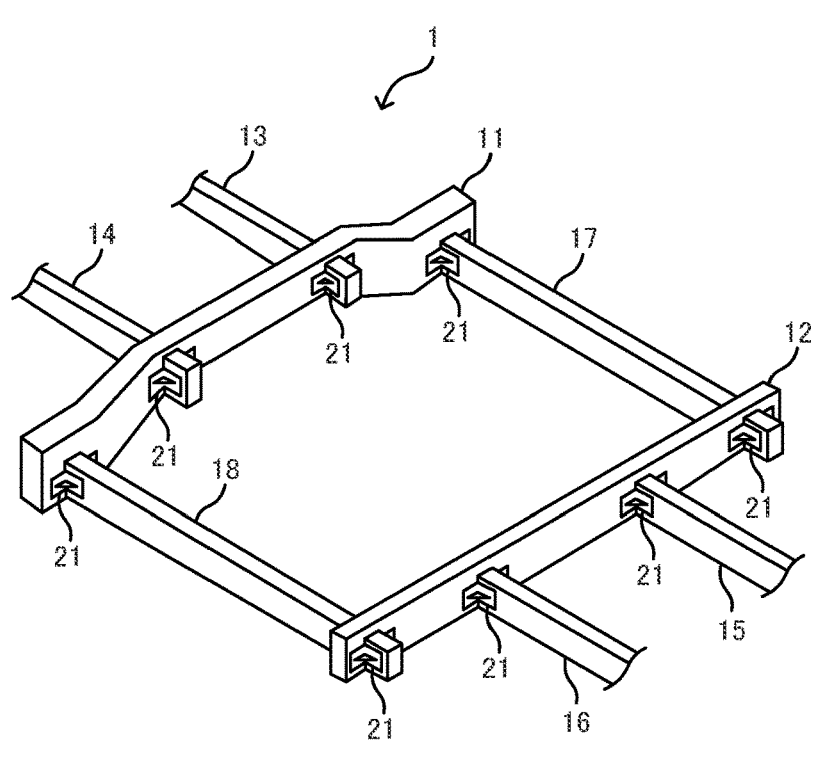
FIG. 2 is a perspective view of the frame structure.

FIG. 1 shows an outline of a frame structure 1 mounted in a vehicle. FIG. 2 is a perspective view of the frame structure 1. The vehicle is a commercial vehicle, for example. FIG. 1 is a schematic view showing a state where the frame structure 1 is viewed from above the vehicle. The frame structure 1 is provided at a position where the frame structure 1 does not interfere with a wheel W.

As shown in FIGS. 1 and 2, the frame structure 1 includes a front intermediate member 11, a rear intermediate member 12, a first front side member 13, a second front side member 14, a first rear side member 15, a second rear side member 16, a first intermediate side member 17, and a second intermediate side member 18. The front intermediate member 11 has four or more front through-holes, and is provided such that its longitudinal direction coincides with the width direction (i.e., the horizontal direction) of the vehicle. The rear intermediate member 12 has four or more rear through-holes, and is provided behind the front intermediate member 11 such that the longitudinal direction of the rear intermediate member 12 coincides with the width direction of the vehicle.

Figure 3A:
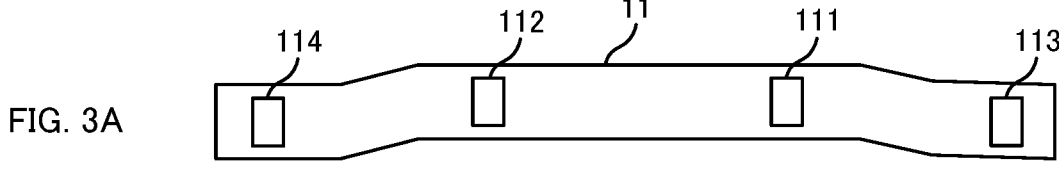
FIGS. 3A and 3B are planar views of a front intermediate member and a rear intermediate member when viewing from the longitudinal direction of the vehicle.
Figure 3B:
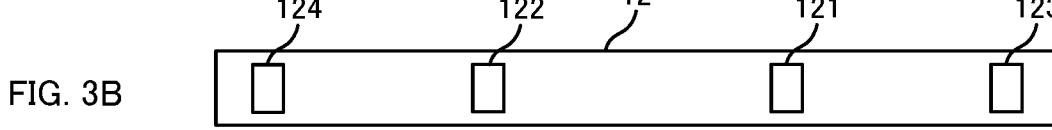

FIGS. 3A and 3B are planar views of the front intermediate member 11 and the rear intermediate member 12 when viewing from the rear of the vehicle. Although the number of front through-holes of the front intermediate member 11 and the number of rear through-holes of the rear intermediate member 12 are arbitrary, four front through-holes and four rear through-holes are provided in the example shown in FIGS. 3A and 3B. That is, the front intermediate member 11 has a first front through-hole 111, a second front through-hole 112, a third front through-hole 113, and a fourth front through-hole 114. Further, the rear intermediate member 12 has a first rear through-hole 121, a second rear through-hole 122, a third rear through-hole 123, and a fourth rear through-hole 124.

The shapes of the front through-hole and the rear through-hole are the same as a cross-sectional shape of a side member to be inserted, and are larger than the cross-sectional shape of the side member. As shown in FIG. 2, if the first front side member 13, the second front side member 14, the first rear side member 15, and the second rear side member 16 have rectangular, closed cross-sections, the front through-hole and the rear through-hole are rectangular such that the first front side member 13, the second front side member 14, the first rear side member 15, and the second rear side member 16 can be inserted thereinto.

The first front side member 13 is fixed to the front intermediate member 11 by a gusset 21 in a state of being inserted in the first front through-hole 111 of the front intermediate member 11, and extends from the front intermediate member 11 to the front of the vehicle. The second front side member 14 is fixed to the front intermediate member 11 by the gusset 21 in a state of being inserted in the second front through-hole 112 of the front intermediate member 11, and extends from the front intermediate member 11 to the front of the vehicle. In the example shown in FIG. 1, the first front side member 13 and the second front side member 14 are parallel to the longitudinal direction of the vehicle, but the first front side member 13 and the second front side member 14 need not be parallel to the longitudinal direction of the vehicle.

The first rear side member 15 is fixed to the rear intermediate member 12 by the gusset 21 in a state of being inserted in the first rear through-hole 121 of the rear intermediate member 12, and extends from the rear intermediate member 12 to the rear of the vehicle. The second rear side member 16 is fixed to the rear intermediate member 12 by the gusset 21 in a state of being inserted in the second rear through-hole of the rear intermediate member 12, and extends from the rear intermediate member 12 to the rear of the vehicle.

Between the front intermediate member 11 and the rear intermediate member 12, the first intermediate side member 17 is fixed to the front intermediate member 11 and the rear intermediate member 12 by the gusset 21 in a state of being inserted in the third front through-hole 113 of the front intermediate member 11 and the third rear through-hole 123 of the rear intermediate member 12. Between the front intermediate member 11 and the rear intermediate member 12, the second intermediate side member 18 is fixed to the front intermediate member 11 and the rear intermediate member 12 by the gusset 21 in a state of being inserted in the fourth front through-hole 114 of the front intermediate member 11 and the fourth rear through-hole 124 of the rear intermediate member 12.

In the example shown in FIGS. 3A and 3B, the first front through-hole 111 and the second front through-hole 112 are formed closer to the center than the third front through-hole 113 and the fourth front through-hole 114, and the first rear through-hole 121 and the second rear through-hole 122 are formed closer to the center than the third rear through-hole 123 and the fourth rear through-hole 124. As shown in FIG. 2, the distance between the first intermediate side member 17 and the second intermediate side member 18 is larger than the distance between the first front side member 13 and the second front side member 14 and the distance between the first rear side member 15 and the second rear side member 16.

Accordingly, the size of the region surrounded by the front intermediate member 11, the rear intermediate member 12, the first intermediate side member 17, and the second intermediate side member 18 is larger than in a case where the distance between the first intermediate side member 17 and the second intermediate side member 18 is equal to (i) the distance between the first front side member 13 and the second front side member 14 and (ii) the distance between the first rear side member 15 and the second rear side member 16. As a result, it is possible to sufficiently ensure an area for a cargo bed to be provided above this region, and to sufficiently ensure a space for accommodating equipment such as a battery or a tank below the cargo bed.

Further, each side member is coupled to one of the front intermediate member 11 or the rear intermediate member 12 by the gusset 21 in a state of being inserted in the front through-hole or the rear through-hole. Since the frame structure 1 configured in this manner makes it possible to easily perform alignment by inserting the side member into the front through-hole or the rear through-hole, it is possible to manufacture the frame structure 1 easily without special jigs as compared with a case where the side member is coupled to the front intermediate member 11 and the rear intermediate member 12 by welding.

In the example shown in FIGS. 3A and 3B, the position of the first front through-hole 111 in the longitudinal direction of the front intermediate member 11 (i.e., the width direction of the vehicle) and the position of the first rear through-hole 121 in the longitudinal direction of the rear intermediate member 12 (i.e., the width direction of the vehicle) are the same. Further, the position of the second front through-hole 112 in the longitudinal direction of the front intermediate member 11 is the same as the position of the second rear through-hole 122 in the longitudinal direction of the rear intermediate member 12.

Since the front intermediate member 11 and the rear intermediate member 12 are configured in this manner, a longitudinal-direction extension line of the first front side member 13 coincides with a longitudinal-direction extension line of the first rear side member 15, and a longitudinal-direction extension line of the second front side member 14 coincides with a longitudinal-direction extension line of the second rear side member 16. Such a configuration is suitable when the first front side member 13 and the second front side member 14 are provided closer to the center than two front wheels, and the first rear side member 15 and the second rear side member 16 are provided closer to the center than two rear wheels.

However, the position of the first front through-hole 111 and the position of the first rear through-hole 121 in the width direction of the vehicle may be different from each other, and the position of the second front through-hole 112 and the position of the second rear through-hole 122 may be different from each other. Such a configuration is suitable when it is necessary to achieve different distances between the side frames at the front and the rear of the vehicle.

Further, in the example shown in FIGS. 3A and 3B, the position of the third front through-hole 113 in the longitudinal direction of the front intermediate member 11 is the same as the position of the third rear through-hole 123 in the longitudinal direction of the rear intermediate member 12. Further, the position of the fourth front through-hole 114 in the longitudinal direction of the front intermediate member 11 is the same as the position of the fourth rear through-hole 124 in the longitudinal direction of the rear intermediate member 12. As a result, as shown in FIG. 1, the first intermediate side member 17 and the second intermediate side member 18 are parallel to each other. The frame structure 1 configured in this manner can increase the strength of the frame structure 1 in the longitudinal direction of the vehicle.

In the example shown in FIGS. 3A and 3B, the positions of the first front through-hole 111 and the second front through-hole 112 in the longitudinal direction of the front intermediate member 11 are closer to the center of the vehicle than the positions of the third front through-hole 113 and the fourth front through-hole 114 in the longitudinal direction of the front intermediate member 11. Similarly, the positions of the first rear through-hole 121 and the second rear through-hole 122 in the longitudinal direction of the rear intermediate member 12 are closer to the center of the vehicle than the positions of the third rear through-hole 123 and the fourth rear through-hole 124 in the longitudinal direction of the rear intermediate member 12.

Since the front intermediate member 11 and the rear intermediate member 12 are configured in this manner, the distance between side members near the center of the vehicle can be increased more than the distance between side members at the front and the rear of the vehicle. Such a configuration is suitable for a case of increasing the width of the cargo bed near the center of the vehicle, or increasing allowable loads on both sides of the cargo bed near the center of the vehicle.

Incidentally, the heights of the first front side member 13 and the second front side member 14 may be different from the heights of the first rear side member 15 and the second rear side member 16. Specifically, the position of the first front through-hole 111 and the position of the first rear through-hole 121 in the height direction of the vehicle may be different from each other, and the position of the second front through-hole 112 and the position of the second rear through-hole 122 in the height direction of the vehicle may be different from each other. The positions of the third front through-hole 113 and the third rear through-hole 123 in the height direction of the vehicle may be the same, and the positions of the fourth front through-hole 114 and the fourth rear through-hole 124 in the height direction of the vehicle may be the same.

Such a configuration of the frame structure 1 is suitable when it is necessary to ensure a large space for accommodating equipment below the side frame either in front of the front intermediate member 11 or behind the rear intermediate member 12. In the example shown in FIG. 2, the heights of the positions where the first front side member 13 and the second front side member 14 are coupled to the front intermediate member 11 are above the heights of the positions where the first intermediate side member 17 and the second intermediate side member 18 are coupled to the front intermediate member 11. In this way, when a portion near the center of the front intermediate member 11 is higher than a portion near both ends, it is possible to increase the space below the first front side member 13 and the second front side member 14 for accommodating equipment, as compared with a case where the front intermediate member 11 is formed to be linear.

First Modified Example

In the above description, the first intermediate side member 17 and the second intermediate side member 18 are composed of one member having a closed cross-section, but the first intermediate side member 17 and the second intermediate side member 18 may be composed of a base member and a reinforcing member.

Specifically, in this case, the first intermediate side member 17 includes a first reinforcing member and a first reinforcing member provided at least one of above or below a linear first base member, and the second intermediate side member 18 includes a second reinforcing member 182 and a second reinforcing member 183 provided at least one of above or below a linear second base member 181. The width of the first intermediate side member 17 and the width of the second intermediate side member 18 in the height direction of the vehicle in a region between the front intermediate member 11 and the rear intermediate member 12 are larger than the width of the first intermediate side member 17 and the width of the second intermediate side member 18 in the height direction of the vehicle in regions in front of the front intermediate member 11 and behind the rear intermediate member 12.

Figure 4A:
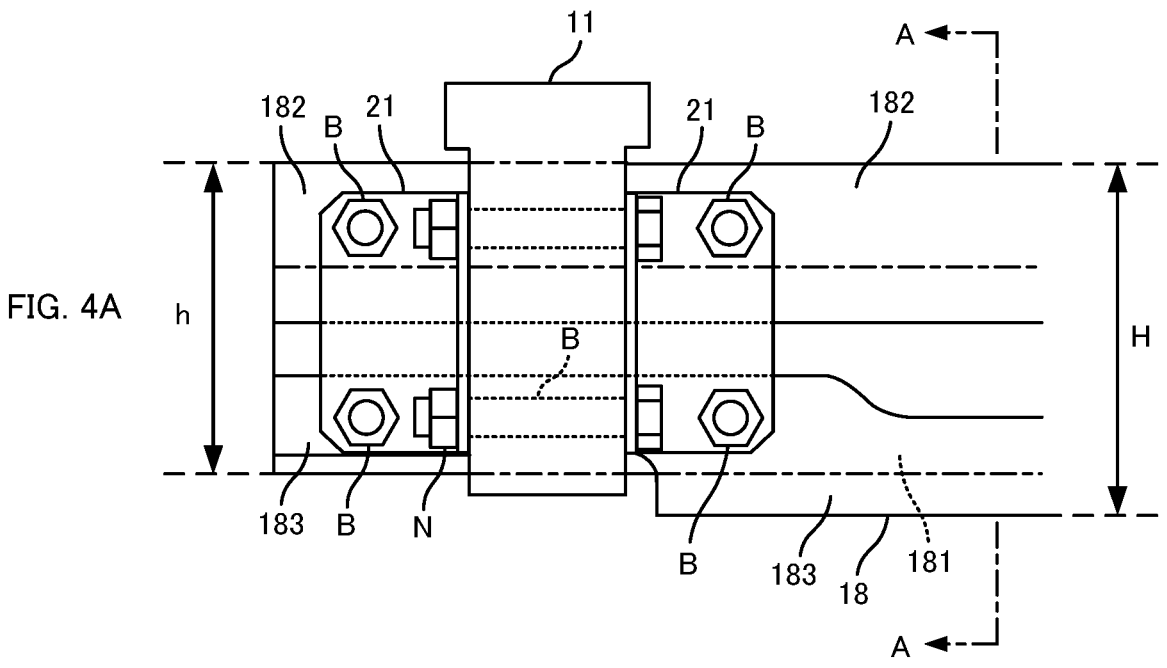
FIGS. 4A and 4B show a configuration of a modified example of a second intermediate side member.
Figure 4B:
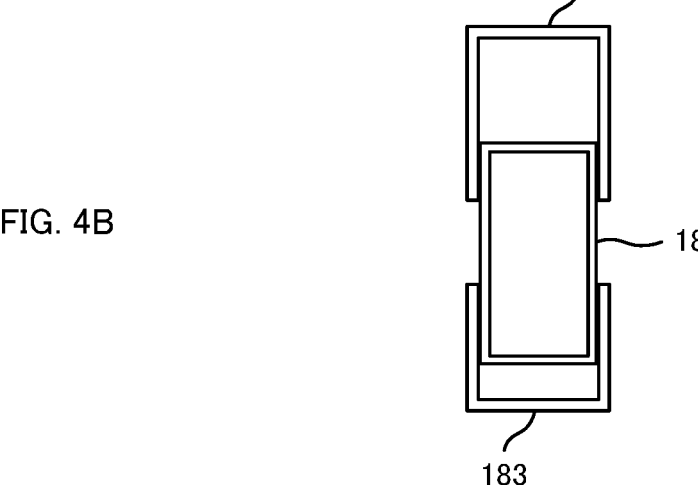

FIGS. 4A and 4B show a configuration of a modified example of the second intermediate side member 18. FIG. 4A shows the periphery of a portion where the front intermediate member 11 and the second intermediate side member 18 are coupled to each other when viewed from the left side of the vehicle. FIG. 4B shows an A-A line cross section.

In the example shown in FIGS. 4A and 4B, the second reinforcing member 182 is provided such that it covers an upper end portion of the second base member 181, and the second reinforcing member 183 is provided such that it covers a lower end portion of the second base member 181. As shown in FIG. 4B, cross sections of the second reinforcing member 182 and the second reinforcing member 183 are U-shaped.

The second reinforcing member 182 penetrates the front intermediate member 11 while covering the second base member 181, and is coupled to the front intermediate member 11 by being fastened together with the gusset 21 by a bolt B. The second reinforcing member 183 penetrates the front intermediate member 11 while covering the second base member 181, and is coupled to the front intermediate member 11 by being fastened together with the gusset 21 and the second base member 181 by the bolt B.

The width of the second reinforcing member 183 in the height direction in a region behind the front intermediate member 11 is larger than the width of the second reinforcing member 183 in the height direction in a region in front of the front intermediate member 11. That is, in the region behind the front intermediate member 11, a lower end of the second reinforcing member 183 is below a lower end of the through-hole formed on the front intermediate member 11. As a result, in the configuration shown in FIGS. 4A and 4B, a width H of a member in which the second base member 181, the second reinforcing member 182, and the second reinforcing member 183 are coupled to each other, in the height direction in the region behind the front intermediate member 11 is larger than a width h of the member in the height direction in the region in front of the front intermediate member 11. That is, the width of the side frame in the height direction in the region between the front intermediate member 11 and the rear intermediate member 12 is larger than the width of the side frame in the height direction in the example shown in FIG. 2. As a result, it is possible to increase strength in the height direction in the region between the front intermediate member 11 and the rear intermediate member 12.

The second reinforcing member 183 is configured to have the largest width in the height direction at a position where the second reinforcing member 183 is coupled to the gusset 21 by the bolt B. The second reinforcing member 183 configured in this manner can strengthen a portion where the second reinforcing member 183 is coupled to the second base member 181 while realizing weight reduction. In FIGS. 4A and 4B, a case where the second intermediate side member 18 includes the second reinforcing member 182 and the second reinforcing member 183 was illustrated as an example, but the second intermediate side member 18 may include only one of the second reinforcing member 182 or the second reinforcing member 183.

Second Modified Example

In the example shown in FIGS. 3A and 3B, the front intermediate member 11 and the rear intermediate member 12 have four through-holes, but the number of through-holes of the front intermediate member 11 and the rear intermediate member 12 is arbitrary. A front intermediate member 11 and rear intermediate member 12 having more through-holes results in an increased degree of freedom in the distance between the first front side member 13 and the second front side member 14 and the distance between the first rear side member 15 and the second rear side member 16. As a result, it is possible to manufacture vehicles in which at least one of (i) the distance between the first front side member 13 and the second front side member 14, or (ii) the distance between the first rear side member 15 and the second rear side member 16 differ among the vehicles, using the common front intermediate member 11 and rear intermediate member 12, which leads to improving manufacturing efficiency and reducing manufacturing cost.

Third Modified Example

In the example shown in FIGS. 3A and 3B, the front intermediate member 11 is not linear, and the positions of the first front through-hole 111 and the second front through-hole 112 in the height direction of the vehicle are above the positions of the third front through-hole 113 and the fourth front through-hole 114. However, the front intermediate member 11 may be linear as well as the rear intermediate member 12. Further, the rear intermediate member 12 may be configured such that some rear through-holes are positioned above the other rear through-holes, like the front intermediate member 11 shown in FIGS. 3A and 3B. Further, the front intermediate member 11 and the rear intermediate member 12 may be configured to be linear, and such that the heights the positions of some through-holes may be different from the heights of the positions of the other through-holes. [Effect of the Frame Structure 1]

As described above, in the frame structure 1, the first front side member 13 and the second front side member 14 are provided at the front of the front intermediate member 11 in a state of being inserted in two through-holes of the front intermediate member 11 having four or more through-holes. Further, the first rear side member 15 and the second rear side member 16 are provided at the rear of the front intermediate member 11 in a state of being inserted in two through-holes of the rear intermediate member 12 having four or more through-holes. The first intermediate side member 17 and the second intermediate side member 18 are provided between the front intermediate member 11 and the rear intermediate member 12 in a state of being inserted in two of the other through-holes of the front intermediate member 11 and the rear intermediate member 12.

The frame structure 1 configured in this manner allows the distance between side frames in a halfway region in the longitudinal direction of the vehicle to be different from the distance between side frames in regions in front of and behind the halfway region using a frame having a linear shape when viewed from above. In other words, it is possible to increase the distance between a plurality of side frames in a partial region of the vehicle while ensuring sufficient strength in the longitudinal direction and the width direction of the vehicle. As a result, it is possible to sufficiently ensure a space for installing equipment at the side of the side frame.

Further, the first front side member 13, the second front side member 14, the first rear side member 15, the second rear side member 16, the first intermediate side member 17, and the second intermediate side member 18 are inserted into the through-holes of the front intermediate member 11 and the rear intermediate member 12, and then fixed thereto by the gusset 21. Therefore, the frame structure 1 does not require assembly jigs necessary for coupling these members by welding, and thus mass productivity can be improved.

The present disclosure is explained on the basis of the exemplary embodiments. The technical scope of the present disclosure is not limited to the scope explained in the above embodiments and it is possible to make various changes and modifications within the scope of the invention. For example, all or a portion of the device may be functionally or physically distributed and integrated in arbitrary units. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF REFERENCE NUMERALS 1 frame structure
11 front intermediate member
12 rear intermediate member
13 first front side member
14 second front side member
15 first rear side member
16 second rear side member
17 first intermediate side member
18 second intermediate side member
21 gusset
111 first front through-hole
112 second front through-hole
113 third front through-hole
114 fourth front through-hole
121 first rear through-hole
122 second rear through-hole
123 third rear through-hole
124 fourth rear through-hole
181 second base member
182 second reinforcing member
183 second reinforcing member

The invention claimed is:

1. A frame structure in a vehicle, the frame structure comprising:
a front intermediate member that has four or more front through-holes and is provided such that a longitudinal direction of the front intermediate member coincides with a width direction of the vehicle;
a rear intermediate member that has four or more rear through-holes and is provided behind the front intermediate member such that a longitudinal direction of the rear intermediate member coincides with the width direction of the vehicle;
a first front side member that is fixed to a first front through-hole of the front intermediate member in a state of being inserted in the first front through-hole and extends forward from the front intermediate member;
a second front side member that is fixed to a second front through-hole of the front intermediate member in a state of being inserted in the second front through-hole and extends forward from the front intermediate member;
a first rear side member that is fixed to a first rear through-hole of the rear intermediate member in a state of being inserted in the first rear through-hole and extends rearward from the rear intermediate member;
a second rear side member that is fixed to a second rear through-hole of the rear intermediate member in a state of being inserted in the second rear through-hole and extends rearward from the rear intermediate member;
a first intermediate side member that is fixed between the front intermediate member and the rear intermediate member in a state of being inserted in a third front through-hole of the front intermediate member and a third rear through-hole of the rear intermediate member; and
a second intermediate side member that is fixed between the front intermediate member and the rear intermediate member in a state of being inserted in a fourth front through-hole of the front intermediate member and a fourth rear through-hole of the rear intermediate member, wherein
the first intermediate side member includes a first reinforcing member provided at least one of above or below a linear first base member,
the second intermediate side member includes a second reinforcing member provided at least one of above or below a linear second base member, and
a width of the first intermediate side member and a width of the second intermediate side member in the height direction of the vehicle in a region between the front intermediate member and the rear intermediate member are larger than a width of the first intermediate side member and a width of the second intermediate side member in the height direction of the vehicle in a region in front of the front intermediate member and behind the rear intermediate member.

2. The frame structure according to claim 1, wherein
a position of the first front through-hole in the longitudinal direction of the front intermediate member is the same as a position of the first rear through-hole in the longitudinal direction of the rear intermediate member, and
a position of the second front through-hole in the longitudinal direction of the front intermediate member is the same as a position of the second rear through-hole in the longitudinal direction of the rear intermediate member.

3. The frame structure according to claim 2, wherein
a longitudinal-direction extension line of the first front side member and a longitudinal-direction extension line of the first rear side member coincide with each other, and a longitudinal-direction extension line of the second front side member and a longitudinal-direction extension line of the second rear side member coincide with each other.

4. The frame structure according to claim 1, wherein
a position of the third front through-hole in the longitudinal direction of the front intermediate member is the same as a position of the third rear through-hole in the longitudinal direction of the rear intermediate member;
a position of the fourth front through-hole in the longitudinal direction of the front intermediate member is the same as a position of the fourth rear through-hole in the longitudinal direction of the rear intermediate member; and the first intermediate side member and the second inter-
mediate side member are parallel to each other.

5. The frame structure according to claim 1, wherein
the position of the first front through-hole and the position
of the first rear through-hole in a height direction of the
vehicle are different from each other,
the position of the second front through-hole and the
position of the second rear through-hole in the height
direction of the vehicle are different from each other,
the positions of the third front through-hole and the third
rear through-hole in the height direction of the vehicle
are the same, and
the positions of the fourth front through-hole and the
fourth rear through-hole in the height direction of the
vehicle are the same.

6. The frame structure according to claim 1, wherein
a shape of the first front through-hole is equivalent to a
cross-sectional shape of the first front side member to
be inserted, and a cross-sectional area of the first front
through-hole is larger than a cross-sectional area of the
first front side member,
a shape of the second front through-hole is equivalent to
a cross-sectional shape of the second front side member
to be inserted, and a cross-sectional area of the second
front through-hole is larger than a cross-sectional area
of the second front side member,
a shape of the first rear through-hole is equivalent to a
cross-sectional shape of the first rear side member to be
inserted, and a cross-sectional area of the first rear
through-hole is larger than a cross-sectional area of the
first rear side member, and
a shape of the second rear through-hole is equivalent to a
cross-sectional shape of the second rear side member to
be inserted, and a cross-sectional area of the second
rear through-hole is larger than a cross-sectional area of
the second rear side member.

7. The frame structure according to claim 1, wherein
a distance between the first intermediate side member and
the second intermediate side member is larger than a
distance between the first front side member and the
second front side member and a distance between the
first rear side member and the second rear side member.

8. A frame structure in a vehicle, the frame structure
comprising:
a front intermediate member that has four or more front
through-holes and is provided such that a longitudinal
direction of the front intermediate member coincides
with a width direction of the vehicle;
a rear intermediate member that has four or more rear
through-holes and is provided behind the front inter-
mediate member such that a longitudinal direction of
the rear intermediate member coincides with the width
direction of the vehicle;
a first front side member that is fixed to a first front
through-hole of the front intermediate member in a
state of being inserted in the first front through-hole and
extends forward from the front intermediate member;
a second front side member that is fixed to a second front
through-hole of the front intermediate member in a
state of being inserted in the second front through-hole
and extends forward from the front intermediate mem-
ber;
a first rear side member that is fixed to a first rear
through-hole of the rear intermediate member in a state
of being inserted in the first rear through-hole and
extends rearward from the rear intermediate member;

a second rear side member that is fixed to a second rear
through-hole of the rear intermediate member in a state
of being inserted in the second rear through-hole and
extends rearward from the rear intermediate member;
a first intermediate side member that is fixed between the
front intermediate member and the rear intermediate
member in a state of being inserted in a third front
through-hole of the front intermediate member and a
third rear through-hole of the rear intermediate mem-
ber; and
a second intermediate side member that is fixed between
the front intermediate member and the rear intermedi-
ate member in a state of being inserted in a fourth front
through-hole of the front intermediate member and a
fourth rear through-hole of the rear intermediate mem-
ber, wherein
the positions of the first front through-hole and the second
front through-hole in the longitudinal direction of the
front intermediate member are closer to a center of the
vehicle than the positions of the third front through-
hole and the fourth front through-hole in the longitu-
dinal direction of the front intermediate member,
the first intermediate side member includes a first rein-
forcing member provided at least one of above or
below a linear first base member,
the second intermediate side member includes a second
reinforcing member provided at least one of above or
below a linear second base member, and
a width of the first intermediate side member and a width
of the second intermediate side member in the height
direction of the vehicle in a region between the front
intermediate member and the rear intermediate member
are larger than a width of the first intermediate side
member and a width of the second intermediate side
member in the height direction of the vehicle in a
region in front of the front intermediate member and
behind the rear intermediate member.

9. The frame structure according to claim 8, wherein
a position of the first front through-hole in the longitudi-
nal direction of the front intermediate member is the
same as a position of the first rear through-hole in the
longitudinal direction of the rear intermediate member,
and
a position of the second front through-hole in the longi-
tudinal direction of the front intermediate member is
the same as a position of the second rear through-hole
in the longitudinal direction of the rear intermediate
member.

10. The frame structure according to claim 9, wherein
a longitudinal-direction extension line of the first front
side member and a longitudinal-direction extension
line of the first rear side member coincide with each
other, and a longitudinal-direction extension line of the
second front side member and a longitudinal-direction
extension line of the second rear side member coincide
with each other.

11. The frame structure according to claim 8, wherein
a position of the third front through-hole in the longitu-
dinal direction of the front intermediate member is the
same as a position of the third rear through-hole in the
longitudinal direction of the rear intermediate member;
a position of the fourth front through-hole in the longi-
tudinal direction of the front intermediate member is
the same as a position of the fourth rear through-hole in
the longitudinal direction of the rear intermediate mem-
ber; and the first intermediate side member and the second intermediate side member are parallel to each other.

12. The frame structure according to claim 8, wherein the position of the first front through-hole and the position of the first rear through-hole in a height direction of the vehicle are different from each other, the position of the second front through-hole and the position of the second rear through-hole in the height direction of the vehicle are different from each other, the positions of the third front through-hole and the third rear through-hole in the height direction of the vehicle are the same, and the positions of the fourth front through-hole and the fourth rear through-hole in the height direction of the vehicle are the same.

13. The frame structure according to claim 8, wherein a shape of the first front through-hole is equivalent to a cross-sectional shape of the first front side member to be inserted, and a cross-sectional area of the first front through-hole is larger than a cross-sectional area of the first front side member, a shape of the second front through-hole is equivalent to a cross-sectional shape of the second front side member to be inserted, and a cross-sectional area of the second front through-hole is larger than a cross-sectional area of the second front side member, a shape of the first rear through-hole is equivalent to a cross-sectional shape of the first rear side member to be inserted, and a cross-sectional area of the first rear through-hole is larger than a cross-sectional area of the first rear side member, and a shape of the second rear through-hole is equivalent to a cross-sectional shape of the second rear side member to be inserted, and a cross-sectional area of the second rear through-hole is larger than a cross-sectional area of the second rear side member.

14. The frame structure according to claim 8, wherein a distance between the first intermediate side member and the second intermediate side member is larger than a distance between the first front side member and the second front side member and a distance between the first rear side member and the second rear side member.

* * * * *